Figure 1:
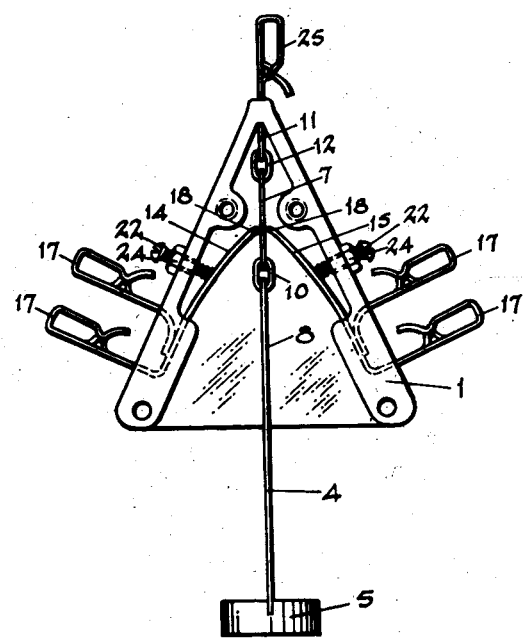

Sept. 27, 1938.  R. E. BEERMAN  2,131,090
SIGNALING DEVICE
Filed Jan. 16, 1937

Inventor
Raymond E. Beerman
By *Faust & Crampton*
Attorney

Patented Sept. 27, 1938

2,131,090

UNITED STATES PATENT OFFICE 2,131,090

SIGNALING DEVICE

Raymond E. Beerman, Toledo, Ohio

Application January 16, 1937, Serial No. 120,976

1 Claim. (Cl. 200—52)

My invention relates to signaling devices that have particular advantageous utility when applied to movable objects to indicate the location of the objects, as well as their movement, such as when constituting a part of the signaling or warning equipment of conveyances.

The invention has for its particular object to provide, in connection with the ordinary electric lighting system commonly used in connection with automotive conveyances, a gravity actuated means for "blinking" or flashing an electric lamp by alternately opening and closing the circuit in which the lamp is located.

The invention may be used to control the periodic flow of electric current through a plurality of lamps to produce repeated alternate, or sequential, or simultaneous opening and closing of one or more electric circuits in which one or more electric lamps are connected to the source of supply of electric current.

The invention also provides means for maintaining one or more of the circuits of the lamps closed when the movable object, such as a conveyance, is stationary.

The invention consists in other features which will appear from the following description and upon examination of the drawing forming a part hereof. Structures containing the invention may partake of different forms and may be varied in their details and still embody the invention. To illustrate a practical application of the invention, I have selected an automobile signaling device as an example of the various structure that contains the invention and shall describe the selected structure hereinafter, it being understood that certain features of my invention may be used to advantage without a corresponding use of other features of the invention and without departing from the spirit of the invention as presented in the claim. The particular structure selected is shown in the accompanying drawing.

Figure 2:
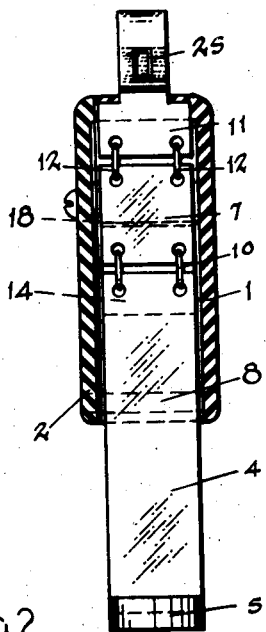
Figure 3:
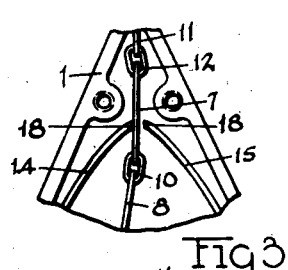
Figure 4:
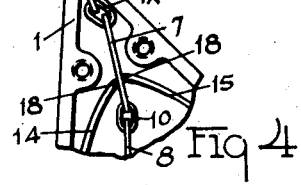
Figure 5:
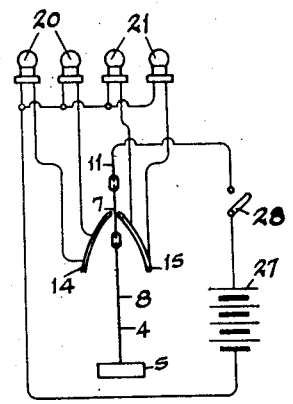

Fig. 1 illustrates a side view of the signal device selected as an example of different embodiments of the invention, the cover of the device being removed to enable illustration of the co-acting parts of the instrument. Fig. 2 is a vertical section of the enclosing shell and illustrates a side view of parts of the instrument. Fig. 3 illustrates a broken view of a part of the instrument shown in Fig. 1 to indicate positions of parts of the device when the instrument is in one position. Fig. 4 is a view similar to that shown in Fig. 3 and illustrates the relative location of the parts of the device when the instrument is in another position. Fig. 5 illustrates conventionally a diagram of the connections that may be used for connecting two or more lights to the battery of an automobile.

The signaling device illustrated in the figures comprising a shell 1 for receiving parts of the device. It may be provided with a suitable cover 2 for covering the shell 1. The instrument contains a timing element of substantially constant and relative long periodicity of intermittent signaling. A pendulum 4 for controlling the circuits of one or more electric lamps may be suspended from the upper end of the shell 1. The pendulum has a relatively heavy weight cylindrical bob 5, and is relatively long between the center of mass of the bob and the point of suspension of the pendulum. The bob 5 is of relative short height as compared to its diameter to center the mass of the pendulum as low as may be with reference to the point of suspension and the size of the shell. Preferably the shell 1 is formed triangular in shape, and the upper end of the pendulum may be suspended from the upper corner of the shell 1.

The pendulum comprises a pair of interconnected, relatively rigid sheet metal strips 7 and 8 that have a width substantially the same as the diameter of the bob 5. The sheet metal strip 8 is of considerable length and is rigidly connected to the bob 5 at its lower end and to the strip 7 by means of a pair of links 10. A sheet metal part 11 having a width substantially the same as that of the strips 7 and 8 is secured in the upper corner of the shell for suspending the pendulum. The strip 7 is connected to the sheet metal part 11 that may have substantially the same width as the strips 7 and 8. The strip 7 is connected to the sheet metal part 11 by means of a pair of links 12. The strip 7 is relatively short as compared to the length of the strip 8. The links 10 and 12 are preferably oblong in form and have sufficient lengths to permit tilting movement of the shorter strip 7 relative to the longer strip 8 and the sheet metal part 11. Swinging of the bob 5 operates to tilt the strips and correspondingly tilt the pairs of links 10 and 12.

A pair of relatively rigid metal contacts 14 and 15 are mounted on the side walls of the triangular shaped shell 1. Each of the contacts may be connected to one or more electric clips or connectors 17 for conveniently connecting circuits in which electric signaling devices, such as the lamps 20 and 21 are located, to the contacts. The electric contacts 14 and 15 extend preferably arcuately upwardly to opposite sides of the strip 7 to locate their upper ends in close proximity to opposite sides of the strip and but slightly spaced therefrom when the strips of the pendulum and the interconnecting links are located in vertical alignment with the point of suspension of the pendulum. The contacts 14 and 15 may have considerable thickness, particularly at their ends, and the end edge surfaces of the contacts are preferably shaped so as to be located parallel to the side surfaces of the strip 7 when the parts of the pendulum are thus located in vertical alignment with the point of suspension of the pendulum. The end edge surfaces 18 of the contacts 14 and 15 have a length substantially the same as the width of the strip 7. Also the end edges of the contacts 14 and 15 are preferably disposed opposite to each other and located near the lower end of the strip 7.

In order to position the upper ends of the contacts 14 and 15 in close "paper thickness" distance from opposite sides of the strip 7 when the pendulum is located in vertical alignment with its point of suspension, suitable adjusting screws 22 are located in the side walls of the shell 1 to adjust the ends of the contacts 14 and 15 with respect to the lateral surfaces of the strip 7. The screws may be provided with suitable nuts 24 for securing the screws 22 and the ends of the contacts in their adjusted positions.

The sheet metal part 11, on which the pendulum is suspended, is connected to an electric clip or connector 25. Thus, the strip 7 of the pendulum may be connected to one terminal of a battery, such as the battery 27, indicated diagrammatically in Fig. 5. A switch 28 may be located in the connection between the connector 25 and the battery 27. The connectors 17 connected to the contact 14 may be connected to the lamps 20, and the connectors 17 that are connected to the contact 15 may be connected to the lamps 21, and the lamps 20 and 21 may be connected to the other terminal of the battery 27. If desired, one of each of the pair of lamps 20 and 21 may be disposed at opposite ends of the automobile or other conveyance or on opposite sides thereof or as may be desired.

The shell 1 may be secured by any suitable clamping means or screws to any suitable part of the conveyance to normally dispose the pendulum such that the vertical alignment of the strip 7 through the point of suspension of the pendulum will be disposed midway between the ends of the contacts 14 and 15.

The lights producible by the lamps will flash or "blink" in response to the movement of the vehicle relative to the pendulum and the subsequent movements of the pendulum due to its displacement from the vertical. The bob 5, being suspended at a considerable distance from the lower end of the strip 7 by reason of the length of the relative rigid strip 8, will swing to and from its normal position in time periods of considerable length when the shell is once tilted relative to the vertical and thereby produce alternate closing and opening of the circuit from the battery 27 through each pair of the lamps 20 and 21. When the conveyance is moving along a road, it is tilted, jarred, and shaken due to spring action of the springs, etc. which causes constant deflection of the shell relative to the normal vertical position to which the pendulum is biased by the bob 5, and a constant slight swaying movement of the pendulum is produced that maintains constant flashing of the lights during the movement of the vehicle over the roadway. When the bob 5 swings from its normal position with respect to the shell 1, the strip 7 engages an end of one or the other of the contacts 14 or 15, as indicated in Fig. 3, and the bob 5 continues pendulum-wise in its lateral movement and then makes its return movement which maintains the pair of lamps connected to the contact lighted for relative long periods. Upon completion of the return movement, the bob 5 carries the strip 7 beyond its normal position and moves the strip 7 against the other contact to connect the other pair of lamps in the circuit of the contact and maintain them lighted until the bob 5 again moves through its normal position with respect to the shell 1. Thus, the structure operates to produce flashing of each lamp or alternate flashing of two of the lamps or of the pairs of lamps, the light and dark periods having relatively considerable duration that produces strikingly noticeable blinking of the lights.

The movement of the pendulum 4 operates, by reason of the alternate engagement of the strip 7 with the end surfaces of the contacts 14 and 15, to cause the strip 7 to tilt. The tilting is relatively marked by reason of the length of the links 10 and 12. Tilting of the links 10 and 12 produces a rubbing contact between the strip 7 and the end corners and the end edge surfaces of the contacts 14 and 15, and by reason of the friction maintains the contacts clean. If desired, suitable refractory non-corrosive or non-oxidizable metal may be disposed on the ends of the contacts 14 and 15 and on the lateral surfaces of the strip 7 intermediate the ends of the contacts.

Where the deflection of the bob 5 from the normal position is relatively extreme, both pairs of lights will be flashed simultaneously through certain periods, that is, one pair of lights will be illuminated while the other pair is still lighted which produces a marked change in the normal blinking of the lights. This is produced where the strip 7 is deflected from its normal position so as to contact with the upper corner of one of the contacts and with the lower corner of the other of the contacts which will indicate a more extreme jarring and rough riding which has its advantage to a driver of an automobile following an automobile employing the signaling device. Also, when the car is stationary on a part of the road having a marked incline, lighting of all the lamps connected to the two contacts will be produced by the tilt of the strip 7 in the same manner.

I claim:

In a signaling device, a frame, a pair of links connected to the frame, a sheet metal strip connected at the corners of one of its ends to the links and forming an electric contact, a second pair of links connected to the corners of the other end of the strip, a second sheet metal strip connected at the corners of one of its ends to the said second links, a bob connected to the other end of the said second sheet metal strip, a pair of elastic metal contacts secured to the frame, the ends of the contacts located on opposite sides of the first-named metal strip, means for connecting a circuit to the first-named metal strip and to the elastic contacts, the circuit of the contacts opened and closed by the swinging of the pendulum.

RAYMOND E. BEERMAN.